UNITED STATES PATENT OFFICE.

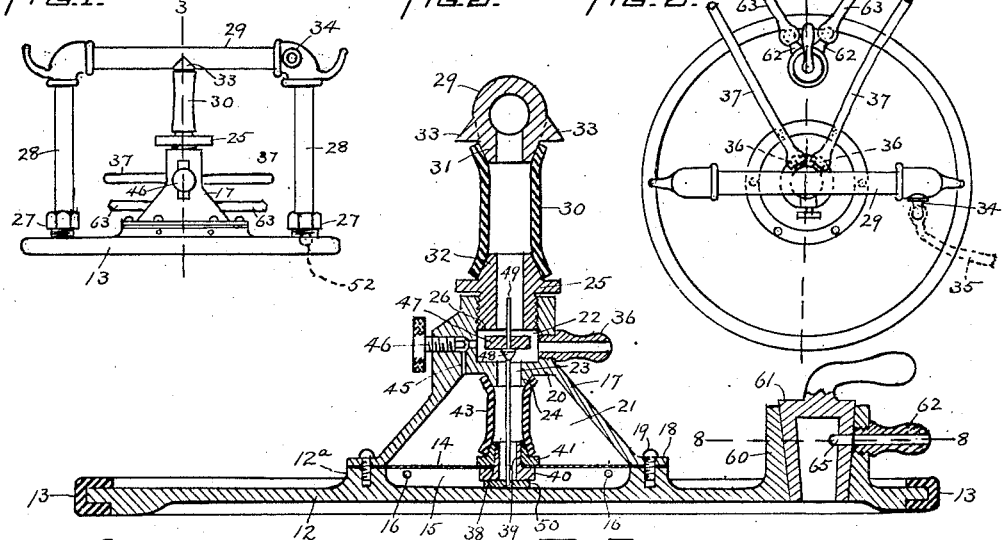

MERRITT C. BARDEN, OF WEST PAWLET, VERMONT.

MILKING APPARATUS.

1,400,512. Specification of Letters Patent. Patented Dec. 20, 1921.

Application filed February 19, 1921. Serial No. 446,269.

*To all whom it may concern:*

Be it known that I, MERRITT C. BARDEN, a citizen of the United States, residing at West Pawlet, in the county of Rutland and State of Vermont, have invented new and useful Improvements in Milking Apparatus, of which the following is a specification.

This invention has for its chief object to simplify and improve that portion of a milking apparatus known as the pulsator.

The invention is embodied in the improvements which I will now proceed to describe and claim, said improvements including, as of the essence of the invention, a flexible diaphragm exposed at one side to the atmosphere and provided with a central opening and with an air tube secured in said opening to conduct air through and from the diaphragm.

Of the accompanying drawings forming a part of this specification,—

Figure 1 is a side view of that portion of a milking apparatus to which my invention relates.

Fig. 2 is a top plan view of the same.

Fig. 3 is a section on line 3—3 of Fig. 1, on a considerably larger scale and about the actual size used in practice.

Figs. 4 and 5 are views similar to portions of Fig. 3 illustrating different stages of the operation.

Figs. 6 and 7 are views similar to Fig. 3 showing modified constructions.

Figs. 8, 9 and 10 are sectional views on the plane of line 8—8 of Fig. 3.

12 represents a base plate which as here shown forms a cover for a milk receptacle, such as a can or pail, and is provided with a marginal packing ring 13 of rubber adapted to make air-tight contact with the internal surface of a pail or the neck of a can.

On the upper side of cover 12 is an annular ridge 12ª supporting the marginal portion of a flexible diaphragm 14 forming the top of an air chamber 15 which communicates with the atmosphere through openings 16 extending through the ridge 12ª. A housing 17 having a base flange 18 is secured by screws 19 to the ridge 12ª, the margin of the diaphragm being clamped between said flange and ridge. In the upper portion of the housing 17 is a partition 20 forming the top of a diaphragm chamber 21 above the diaphragm, and the bottom of a pulsation chamber 22 above the diaphragm chamber. The partition 20 has a passage 23 surrounded by a nipple 24. The top of the pulsation chamber 22 is formed by a tubular externally threaded plug 25 adjustably engaged with an internal thread in the upper portion of the housing 17, the lower end of the plug forming a valve seat 26 surrounding the bore of the plug.

To the cover 12 is secured by unions 27 the ends of an angular vacuum conduit serving as a cover handle and as a conduit whereby air may be exhausted from the receptacle to which the cover is applied and from the pulsation chamber 22, said conduit including upright tubular sections 28 engaged by the unions 27 and an intermediate tubular section 29 connected by elbows with the sections 28. The section 29 communicates through a conduit section 30, which is preferably a length of elastic rubber tubing, with the plug 25, the section 29 and plug 25 being preferably provided with tapered nipples 31 and 32 entering and expanding the end portions of the elastic section 30. Lugs 33 are provided on the section 29 as abutments for the upper end of the section 30.

The angular vacuum conduit is provided with a nipple 34 adapted to engage a flexible tube 35 communicating with a vacuum pipe line. The portion of the housing 17 which surrounds the pulsation chamber 22 is provided with a nipple 36, or, as here shown, with two nipples, adapted to engage flexible air tubes 37, each communicating with the inflatable and deflatable annular spaces in a set of teat cups.

The diaphragm 14 has a central opening 38 (Fig. 3), and in said opening is secured one end of an air tube projecting from the upper side of the diaphragm. In the preferred construction shown by Figs. 3, 4 and 5 said tube is sectional and composed of an inner rigid section preferably formed by assembling a tubular member 39 having an annular head 40 bearing on the under side of the diaphragm and constituting a valve seat, and an internally threaded collar 41 bearing on the upper side of the diaphragm and engaged with an external thread on the member 39. The central portion of the diaphragm is clamped between the head 40 and collar 41 to form an air-tight joint. The air tube includes an elastic soft rubber section 43 engaged at its lower end with the collar 41, a portion of said collar being tapered to constitute a nipple entering and expanding the lower end of the section 43. The upper end of said elastic section is engaged with and expanded by the housing nipple 24. A restricted duct or by-pass 45, controlled by a needle valve 46, connects the diaphragm chamber 21 with the pulsation chamber 22. Within the pulsation chamber is a floating valve 47 resting loosely on a shoulder 48 on a stem 49, the lower end of which is fixed to a lower floating valve 50 adapted to be seated on the annular head 40 secured to the diaphragm.

The operation of the pulsator, above described, is as follows: When the pulsator is at rest the floating valve 47 is off its seat, the diaphragm is in its normal position, and the valve 50 rests on a portion of the cover 12, as shown by Fig. 3. When communication is established between the pulsation chamber and the usual vacuum pipe line, air is exhausted from the receptacle closed by the cover 12, through the angular conduits 28, 29 which communicate with the receptacle through a passage in the cover controlled by an upwardly opening check valve 52 (Fig. 1). Said passage and check valve are preferably employed with only one of the upright sections 28 as indicated by Fig. 1, the other upright section having no communication with the receptacle. Air is at the same time exhausted from the pulsation chamber 22.

The vacuum in the pulsation chamber draws air slowly through the by-pass 45 from the diaphragm chamber 21 and thus causes a gradual upward flexure or bulging of the diaphragm 14, this being permitted by the elasticity of the air tube section 43, until the diaphragm reaches the position shown by Fig. 4. The lower floating valve 50 is held upon its seat 40 by the vacuum and moves upward with the diaphragm, the stem 49 being thus caused to raise the floating valve 47 until the latter closes on its seat 26. This seat 26 is adjustable by rotation of the plug 25, and its adjustment is such that when the floating valve 47 is arrested by the seat 26, the lower valve 50 is separated from its seat 40 and allows air under atmospheric pressure to rush from the chamber 15 through the diaphragm and and the tube 43 and into the pulsation chamber 22, as indicated by the arows in Fig. 4. The vacuum is thus broken, and the pulsation chamber and the tube or tubes leading to the teat cups are subjected to atmospheric pressure. Air from the pulsation chamber 22 now slowly enters the diaphragm chamber 21 via the by-pass 45 and permits the diaphragm to buckle downward toward its normal position. When the diaphragm reaches the position shown by Fig. 5, the head 40 encounters the lower valve 50, thus shutting off atmospheric pressure from the pulsation chamber and returning the valves 50 and 47 and the stem 49 to the positions shown by Fig. 3, the valve 47 being thus caused to drop from its seat, whereupon the described operations are repeated. It should be here stated that the upper valve 47 is preferably, although not necessarily, loose on the stem 49. The soft rubber section 43 of the air tube enables the tube to conform to the movements of the diaphragm, the sectional air tube slightly contracting and elongating as the diaphragm rises and falls.

It will be understood that the alternations of vacuum and atmospheric pressure in the pulsation chamber 22 are communicated in the usual manner to suitable inflatable and deflatable annular chambers in teat cups communicating with the pulsation chamber.

A modified form of pulsator embodying the invention is shown by Fig. 6, in which an air tube 55 clamped to the diaphragm has a sliding fit in a plug 56 screwed into the housing 17, said tube rising and falling with the diaphragm and conducting air to the pulsation chamber when the lower valve 50 is opened.

Fig. 7 shows an embodiment of the invention in which there are no valves movable independently of the diaphragm. The housing is provided with a plug 56 which is similar to that shown by Fig. 6 and has a bore in which a tube 70 has a sliding fit to rise and fall with the diaphragm. The lower end of the tube is clamped to the diaphragm 14, the tube forming a conduit extending through the central opening 38 of the diaphragm. The upper end of the tube projects into the valve chamber 22 and has a closed head 72 constituting a valve adapted to close on the seat 26 in the pulsation chamber. In the tube below its upper end are formed air ports 73 which are within and closed by the bore of the plug 56 when the apparatus is at rest and the diaphragm is in its normal position.

When the pulsation chamber 22 communicates with the vacuum pipe line, the upward flexure of the diaphragm following the withdrawal of air from the diaphragm chamber 21 via the by-pass 45 raises the tube 70 until the valve 72 closes on its seat and the ports 73 are above the plug 56. Air now rushes from the air chamber 15 through the tube 70 and ports 73 into the pulsation chamber and acts on the diaphragm via the by-pass to return the diaphragm to its normal position, so that the valve 72 is opened and the ports 73 are closed by the bore of the plug 56.

The cover 12 is provided with a plug casing 60 in which a plug valve 61 is fitted to turn. Said casing is provided with a nipple or nipples 62 (preferably two) adapted to engage flexible milk tubes 63 communicating with the milk outlets of teat cups, each tube 63 communicating with a set of cups for one cow, so that two cows may be milked into the same receptacle, if desired. The plug valve as here shown is provided with a single elongated port 65 adapted to communicate with both nipples 62, as shown by Fig. 8, or with one nipple only, as shown by Fig. 9, or to be turned out of communication with both nipples as shown by Fig. 10.

In each of the described embodiments of the invention the diaphragm is exposed at one side to the atmosphere and has a central opening and an air tube secured at one end in said opening and extending from the latter to the pulsation chamber, the air tube being either sectional as shown by Figs. 3, 4 and 5, or formed as a single part adapted to slide in a guide as shown by Figs. 6 and 7.

In each embodiment of the invention I have provided means operable by movements of the diaphragm for alternately connecting the pulsation chamber with the atmosphere through the air tube on the diaphragm, and with a vacuum pipe line. I am not limited to either of the specific embodiments of said means shown by the drawings except as otherwise required in certain of the more limited claims.

I claim:

1. A pulsator comprising a housing which includes a pulsation chamber having means adapted for connection with a conduit communicating with a vacuum pipe line, and means adapted for connection with an air and vacuum conduit communicating with teat cups, and a flexible diaphragm forming, with a portion of the housing, a diaphragm chamber which communicates with the pulsation chamber through a restricted by-pass in the housing, the diaphragm being exposed at one side to the atmosphere and provided with an air tube secured in a central opening in the diaphragm and extending from the latter to the pulsation chamber, means operable by movements of the diaphragm being provided for alternately connecting the pulsation chamber with the atmosphere through said air tube, and with the vacuum pipe line.

2. A pulsator substantially as specified by claim 1, the said air tube being adapted to conform to movements of the diaphragm.

3. A pulsator substantially as specified by claim 1, said air tube being composed of a rigid section attached to the diaphragm and a flexible section interposed between the rigid section and the pulsation chamber and adapted to conform to movements of the diaphragm.

4. A pulsator comprising a housing which includes a pulsation chamber having means adapted for connection with a conduit communicating with a vacuum pipe line, and means adapted for connection with an air and vacuum conduit communicating with teat cups, a flexible diaphragm forming, with a portion of the housing, a diaphragm chamber which communicates with the pulsation chamber through a restricted by-pass in the housing, the diaphragm being exposed at one side to the atmosphere and provided with an air tube secured in a central opening in the diaphragm and extending from the latter to the pulsation chamber, and a pair of floating valves connected by a stem passing through said air tube and operable by movements of the diaphragm to alternately connect the pulsation chamber with the atmosphere through said air tube, and with the vacuum pipe line.

5. A pulsator comprising a housing including a pulsation chamber open to the atmosphere and provided with a valve seat, means above the valve seat adapted for connection with a vacuum pipe line and means below the valve seat adapted for connection with an air and vacuum conduit communicating with teat cups, a flexible diaphragm forming, with a portion of the housing, a diaphragm chamber which communicates with the pulsation chamber through a restricted by-pass in the housing, the diaphragm being exposed at one side to the atmosphere and provided with a valve seat and with an air tube secured in a central opening in the diaphragm and extending from the latter to the pulsation chamber, said air tube being adapted to conform to movements of the diaphragm, a pair of stem-connected floating valves, one adapted to coöperate with the diaphragm valve seat and the other with the pulsation chamber valve seat; the arrangement being such that when air is exhausted from the pulsation chamber through the pipe line, the diaphragm is flexed in one direction to shut off the valve chamber from the pipe line and admit air under atmospheric pressure through the diaphragm opening and air tube to the pulsation chamber, and is subsequently flexed in the opposite direction to connect the pulsation chamber with the pipe line and exclude air from the pulsation chamber.

6. A pulsator substantially as specified by claim 5, the pulsation chamber valve seat being formed on a plug adjustably engaged with said housing.

7. In a pulsator, a flexible diaphragm exposed at one side to the atmosphere and forming a wall of a diaphragm chamber, the diaphragm being provided with a central opening and with an air tube secured in said opening.

In testimony whereof I have affixed my signature.

MERRITT C. BARDEN.